(12) United States Patent
Sterling et al.

(10) Patent No.: US 9,305,274 B2
(45) Date of Patent: Apr. 5, 2016

(54) TRAFFIC SHAPING BASED ON REQUEST RESOURCE USAGE

(75) Inventors: David A. Sterling, Apex, NC (US); Siddhartha Mathur, Sammamish, WA (US); Victor Boctor, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 745 days.

(21) Appl. No.: 13/350,827

(22) Filed: Jan. 16, 2012

(65) Prior Publication Data

US 2013/0185427 A1 Jul. 18, 2013

(51) Int. Cl.
*G06F 15/173* (2006.01)
*G06Q 10/06* (2012.01)

(52) U.S. Cl.
CPC ........................ *G06Q 10/06* (2013.01)

(58) Field of Classification Search
CPC ....................................... G06Q 10/06
USPC ................ 709/225, 226; 718/104, 105, 102
See application file for complete search history.

(56) References Cited

U.S. PATENT DOCUMENTS

| | | | |
|---|---|---|---|
| 4,642,756 A | 2/1987 | Sherrod | |
| 5,109,512 A | 4/1992 | Bahr et al. | |
| 5,375,244 A | 12/1994 | McNair | |
| 5,515,538 A | 5/1996 | Kleiman | |
| 5,774,718 A | 6/1998 | Aoshima et al. | |
| 6,477,561 B1 | 11/2002 | Robsman | |
| 6,701,311 B2 | 3/2004 | Biebesheimer et al. | |
| 6,754,664 B1 | 6/2004 | Bush | |
| 6,829,713 B2 | 12/2004 | Cooper et al. | |
| 7,165,088 B2 | 1/2007 | Cohen et al. | |
| 7,206,845 B2 | 4/2007 | Banning et al. | |
| 7,254,607 B2 | 8/2007 | Hubbard et al. | |
| 7,353,538 B2 | 4/2008 | Sample | |
| 7,783,666 B1 | 8/2010 | Zhuge et al. | |
| 7,802,238 B2 | 9/2010 | Clinton | |
| 7,840,647 B2 | 11/2010 | Kloba et al. | |
| RE42,153 E | 2/2011 | Hubbard et al. | |
| 8,103,769 B1 | 1/2012 | Weiser et al. | |
| 8,112,768 B2 | 2/2012 | Wu | |
| 8,190,593 B1 | 5/2012 | Dean | |
| 8,250,196 B2 | 8/2012 | Demir et al. | |
| 8,312,073 B2 | 11/2012 | Jakobsson | |
| 8,468,251 B1 | 6/2013 | Pijewski et al. | |
| 2002/0138643 A1 | 9/2002 | Shin et al. | |
| 2006/0090163 A1 | 4/2006 | Karisson et al. | |
| 2006/0135258 A1 | 6/2006 | Maheshwari et al. | |

(Continued)

OTHER PUBLICATIONS

Office Action, U.S. Appl. No. 12/958,134, filed Dec. 1, 2010, Office Action Notification Date: Jul. 9, 2014, 17 Pages.

(Continued)

*Primary Examiner* — Kenneth R Coulter
(74) *Attorney, Agent, or Firm* — Damon Rieth; Tom Wong; Micky Minhas

(57) ABSTRACT

A current request for a server to perform work for a user profile can be received and processed at the server. It can be determined whether server usage by the profile exhibits a sufficient trend toward a threshold value to warrant performing traffic shaping for the user profile. If so, then a delay time can be calculated based on, or as a function of, server resources used in processing the current request, and a response to the current request can be delayed by the delay time.

20 Claims, 5 Drawing Sheets

(56) References Cited

U.S. PATENT DOCUMENTS

| | | | |
|---|---|---|---|
| 2006/0190482 A1 | 8/2006 | Kishan et al. | |
| 2006/0294228 A1 | 12/2006 | Almstrom | |
| 2007/0118653 A1 | 5/2007 | Bindal | |
| 2007/0233693 A1* | 10/2007 | Baxter et al. | 707/10 |
| 2007/0233694 A1* | 10/2007 | Baxter | 707/10 |
| 2007/0234327 A1* | 10/2007 | Baxter et al. | 717/151 |
| 2008/0120620 A1 | 5/2008 | Lett et al. | |
| 2008/0240144 A1 | 10/2008 | Kruse et al. | |
| 2009/0055829 A1 | 2/2009 | Gibson | |
| 2009/0100435 A1 | 4/2009 | Papaefstathiou et al. | |
| 2009/0172191 A1* | 7/2009 | Dumitriu et al. | 709/241 |
| 2010/0043004 A1 | 2/2010 | Tambi et al. | |
| 2010/0205607 A1 | 8/2010 | Shivanna et al. | |
| 2010/0268798 A1 | 10/2010 | Kourkouzelis et al. | |
| 2011/0087776 A1 | 4/2011 | Tabone et al. | |
| 2011/0153724 A1 | 6/2011 | Raja et al. | |
| 2011/0153828 A1* | 6/2011 | Park et al. | 709/226 |
| 2011/0161488 A1 | 6/2011 | Anderson et al. | |
| 2011/0161964 A1 | 6/2011 | Piazza et al. | |
| 2011/0173038 A1 | 7/2011 | Moon et al. | |
| 2012/0030339 A1* | 2/2012 | Dumitriu et al. | 709/223 |
| 2012/0110572 A1 | 5/2012 | Kodi et al. | |
| 2012/0143992 A1 | 6/2012 | Salamatov et al. | |
| 2012/0174121 A1 | 7/2012 | Treat et al. | |
| 2013/0152097 A1 | 6/2013 | Boctor et al. | |

OTHER PUBLICATIONS

Office Action, U.S. Appl. No. 13/315,382, filed Dec. 9, 2011, Office Action Notification Date: Apr. 9, 2014, 29 Pages.

Office Action, U.S. Appl. No. 13/315,382, filed Dec. 9, 2011, Office Action Notification Date: Apr. 30, 2015, 33 Pages.

Office Action, U.S. Appl. No. 12/958,134, filed Dec. 1, 2010, Office Action Notification Date: Mar. 20, 2014, 21 Pages.

Office Action, U.S. Appl. No. 13/736,080, filed Jan. 8, 2013, Office Action Notification Date: Oct. 2, 2014, 31 Pages.

Office Action, U.S. Appl. No. 13/736,080, filed Jan. 8, 2013, Office Action Notification Date: Jan. 15, 2015, 12 Pages.

Grimm, et al., "Na Kika Secure Service Execution and Composition in an Open Edge-Side Computing Network", in the Proceedings of the 3rd Symposium on Networked Systems Design and Implementation (NSDI '06), May 8, 2006, 14 Pages.

"What's Behind Network Downtime", May 2008, 12 Pages.

"New-Workflow-MakeItEasy Authoring Workflows using PowerShell Extended Syntax", Jul. 21, 2012, 6 Pages.

IBM-Tivoli-Workload-Automation accessed on: Sep. 27, 2011, 2 pages.

Mathur, et al., "Identifying and Throttling Tasks Based on Task Interactivity" U.S. Appl. No. 13/736,080, filed Jan. 8, 2013, 52 Pages.

Office Action, U.S. Appl. No. 12/958,134, filed Dec. 1, 2010, Office Action Notification Date: Jul. 11, 2013, 15 Pages.

Office Action, U.S. Appl. No. 12/958,134, filed Dec. 1, 2010, Office Action Notification Date: Nov. 13, 2013, 15 Pages.

Cobb, Michael, "Using Resource Allocation Management to Prevent DOS and other Attacks", Retrieved at <<http://searchsecurity.techtarget.co.uk/tip/0,289483,sid180_gci1507648,00.html>>, Mar. 31, 2010, pp. 16.

Osborn, Stu, "Determining Health and Wellness of an OCS Deployment—IM and Presence", Retrieved at <<http://blogs.technet.com/b/nexthop/archive/2008/07/28/determining-health-and-wellness-of-an-ocs-deployment-im-and-presence.aspx>>, Jul. 2008, pp. 5.

"How BizTalk Server Implements Host Throttling", Retrieved at <<Ahttp://msdn.microsoft.com/en-us/library/aa559893(v=BTS.70).aspx>>, Retrieved Date: Oct. 19, 2011, pp. 13.

Anderson, et al., "Insider Attack and Real-Time Data Mining of User Behavior", Retrieved at <<http://ieeexplore.ieee.org/stamp/stamp.jsp?tp=&arnumber=5388654>>, Proceedings of IBM Journal of Research and Development, vol. 51, No. 3/4, May/Jul. 2007, pp. 465-475.

Salamatov, et al., "Throttling Usage of Resources", U.S. Appl. No. 12/958,134, filed Dec. 1, 2010, pp. 36.

"Determining Health and Wellness of an OCS Deployment", Microsoft Office Communications Server blog published Jul. 24, 2008, 5 Pages.

"How BizTalk Server Implements Host Throttling", Copyright Date 2010, 7 Pages.

Cobb, Michael; "Using Resource Allocation Management to Prevent DOS and Other Attacks", published Mar. 10, 2010, 3 Pages.

Office Action, U.S. Appl. No. 13/315,382, filed Dec. 9, 2011, Office Action Notification Date: Sep. 11, 2014, 26 Pages.

* cited by examiner

TRAFFIC SHAPING BASED ON REQUEST RESOURCE USAGE

BACKGROUND

A server or server system, as used herein, is at least a portion of one or more computing machines that makes computing resources available to one or more clients, which may each include at least a portion of one or more computing machines. Server systems have employed techniques to protect themselves from unusually heavy users, such as users that are engaged in malicious behavior (e.g., denial-of-service attacks). Some server systems have used predefined hard limits to protect themselves. For example, these server systems may lock out user profiles that reach the hard limits, refusing to allow the locked-out user profiles access the resources of the server systems, at least for a period of time.

SUMMARY

Using hard limits can adversely affect user experience when the hard limits are reached by legitimate users. Setting the hard limits to very high values may avoid some such experiences. However, the high values can leave the server system unprotected or inadequately protected. The tools and techniques described herein relate to shaping a user profile's traffic with a server by delaying responses to requests for the server to perform work for the user profile. For example, the delay time for a current request can be calculated based on, or as a function of, server resources used in processing the current request. In one example, the delay time may be calculated to be proportional or in relation to an amount of time used in responding to the current request. This may allow for one or more benefits, such as preserving user experience while still shaping traffic to protect the server system resources from over-use by a user profile.

In one embodiment, the tools and techniques can include maintaining a budget of server usage associated with a user profile. A current request for a server to perform work for a user profile can be received and processed at the server. It can be determined whether a current balance of the budget warrants performing traffic shaping for the user profile by delaying a response to the current request. For example, this determination may be made in relation to a threshold below which traffic shaping is warranted. For example, the threshold may be zero, so that a negative current balance (i.e., a budget deficit) may indicate that traffic shaping is warranted. If the current balance of the budget warrants delaying the response, then a delay time can be calculated based on server resources used in processing the current request. Additionally, the response to the current request can be delayed by the delay time.

In another embodiment of the tools and techniques, a current request for a server to perform work for a user profile can be received and processed at the server. It can be determined whether server usage by the profile exhibits a sufficient trend toward a threshold value to warrant performing traffic shaping for the user profile according to a traffic shaping policy. If so, then a delay time can be calculated based on server resources used in processing the current request and a response to the current request can be delayed by the delay time.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
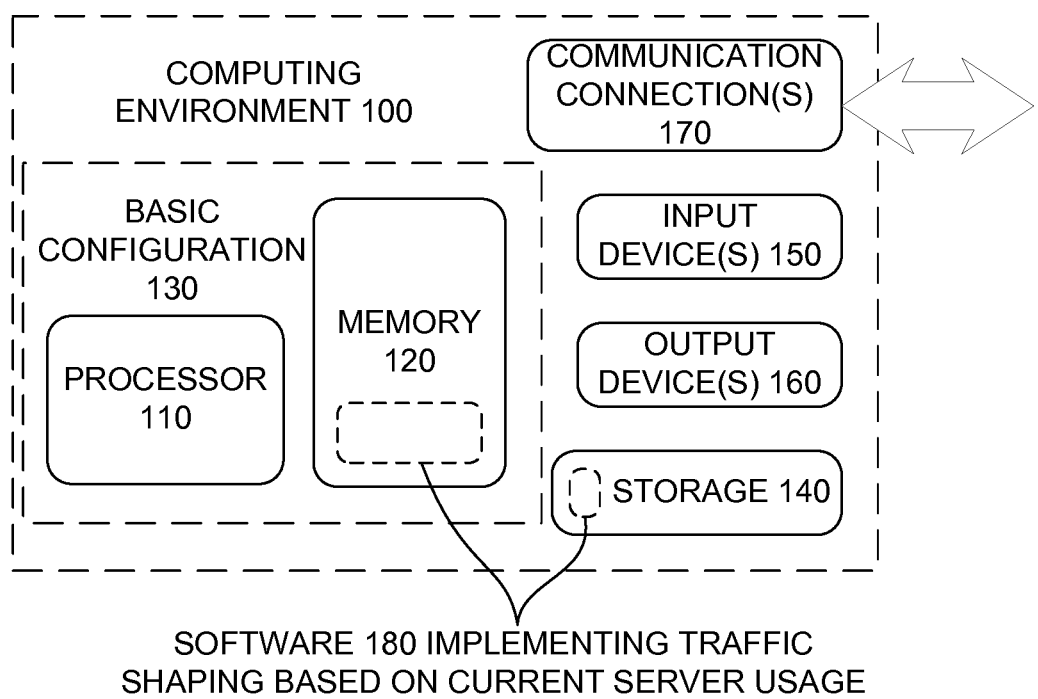
FIG. 1 is a block diagram of a suitable computing environment in which one or more of the described embodiments may be implemented.

Embodiments described herein are directed to techniques and tools for improved protection of server resources by introducing traffic-shaping delays. Such improvements may result from the use of various techniques and tools separately or in combination.

Such techniques and tools may include tracking a user's activity and calculating user "trends" on a continuous basis. A user can either be trending too high or too low. If too high, that means that if the user profile were to continue the current usage pattern, that user profile would exceed the suggested rate of usage. To correct this trend, micro-delays can be inserted when responding to requests when a user profile is trending too high, so that the trend line can be pulled down into the acceptable region. These micro delays can occur after each piece of work is done so that the delays can be a function of the amount of said work, i.e., the delay times can be based on the amount of the work. Accordingly, the delay times may be such that the delay times do not dwarf the time for the work just accomplished, but are large enough to dampen the user profile's trend to acceptable levels.

In addition, so that the user profile does not immediately enter the traffic shaping zone, the concept of "burstiness" can be supported. With this concept being used, a user profile can have a balance of work (a burst balance) that can be spent immediately for short-term heavy operations. However, once the burst balance has been spent, it is expected that the user profile will reduce its rate of requesting work, so that the burst can be recharged (the balance in the budget can be replenished over time, such as at a specified rate). Continued work at bursty levels (above the replenishing rate of the budget) after the burst balance has been spent can result in the user profile entering the traffic shaping zone, where micro delays (or traffic shaping delays) can be introduced to shape the user profile's traffic with the server.

Accordingly, a request can be delayed as a function of the amount of work just accomplished, so as to shape user profile traffic while preserving user experience. Such delays can be calculated and can occur after the work is done, but before responses to the request are sent. A budget can be maintained with a balance that can be carried over to future requests. This carrying over can have the effect of "carrying over" unaccounted for delays to future requests if an internal component is unable to enforce a delay during the current request (e.g., because the delay is capped due to restraints based on a protocol).

Additionally, the burst amount can be independent of the target usage (which can be specified as a budget replenishment rate) for a user profile. This can allow a policy to indicate, for instance, that the user profile can burst for 5 seconds, but can also use 2 minutes of sustained load over an hour. The budget balance can be replenished as the user uses less than their target usage over a period of time. A replenished budget balance may then be used for other bursty operations.

Accordingly, one or more substantial benefits can be realized from the tools and techniques described herein. For example, server system resources may be protected from over-use by user profiles, while still preserving user experience and shaping traffic to keep legitimate users within acceptable levels of usage. The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as a client and/or server environment. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, slate devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing traffic shaping based on current server usage—where introduced delays can be based on server resources used in processing a current request (for example, delay time can be calculated to be proportional to time of the server in responding to the current request).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "receive," "process," and "calculate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. System and Environment for Traffic Shaping Based on Current Server Usage

A. Overall System and Environment

Figure 2:
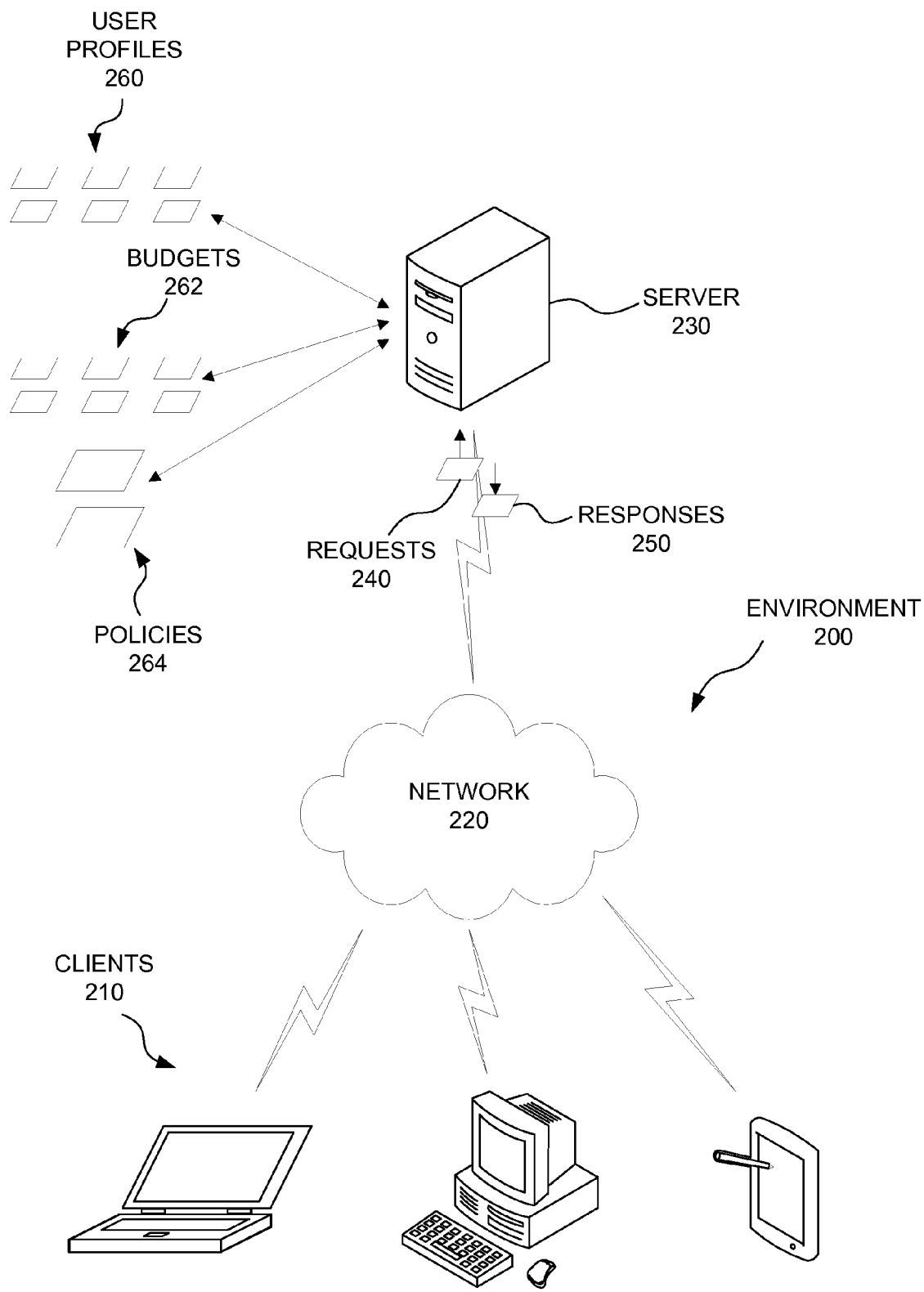
FIG. 2 is a schematic diagram of an environment that can implement traffic shaping based on current server usage.

FIG. 2 is a schematic diagram of an environment (200) that can implement traffic shaping based on current server usage. The environment (200) can include one or more clients (210) that can be connected to a computer network (220). A server (230) can also be connected to the network (220), so that the server (230) can communicate with the clients (210). The clients (210) can submit requests (240) for the server (230) to perform work, and the server (230) can perform the work and provide responses (250). For example, the server (230) may be an email server and the requests may be requests to check email messages, to search through stored email messages, to send email messages, etc. However, the server (230) could be some other type of server that is capable of providing shared resources to clients (210), such as a file server, a database server, a Web server, combinations of these types of servers, etc.

The server (230) can also access user profiles (260), usage budgets (262), and traffic shaping policies (264). The user profiles (260), usage budgets (262), and traffic shaping policies (264) can be local to one server (230) and/or shared between multiple servers. Each of the requests (240) can be associated with a user profile (260), which can be associated with a budget (262), which can track a server usage balance for the associated user profile (260). As will be discussed, the server (230) can introduce traffic-shaping delays in providing the responses (250) to the requests (240), according to the traffic-shaping policies (264). The traffic shaping may be done according to a single policy (264) for all requests (240), a policy (264) for each user profile (260), a policy (264) for each protocol used for the requests (240) and responses (250), or some other policy-request association so that a policy (264) applies to a request (240). The traffic-shaping may be done based on, or as a function of, resources used by the server (230) in responding to the requests (240). For example, the traffic may be based on one or more of various quantifications of resources used by the server (230), such as time spent by the server (230) in responding to requests (240), amount of data submitted to or provided by the server (230), number of requests (240), number of messages sent through and/or received through the server (230), etc.

B. Example Implementation of Traffic Shaping Based on Current Server Usage

An example of an implementation of traffic shaping based on current server usage will not be discussed. The implementation can use a policy (264) that can indicate values for at least three configurable parameters: recharge rate, maximum burst, and cutoff balance.

The recharge rate can be the rate of replenishing "usage" in the profile (e.g., in milliseconds per hour). The recharge rate can also serve as a usage rate target. As an example, a recharge rate of 120,000 can mean that the user's target usage is 120,000 milliseconds per hour, or 2 minutes of use per hour. This also means that a fully depleted balance (zero balance) would recharge to a balance of 2 minutes in an hour if no user activity was encountered during that hour. Alternatively, the recharge rate and the usage rate target may be independent of each other.

Maximum burst is the maximum usage surplus that a user can build up and spend all at once without incurring traffic-shaping delays. Once the balance of a usage budget (262) reaches the maximum burst level, the balance can be capped at that level.

The cutoff balance is a balance of the usage budget (262) that can result in the associated user profile (260) being cut off from accessing resources of the server (230) for a period of time such as for five minutes (i.e., the user profile (260) will be locked out for the period of time). The cutoff balance can be specified in terms of negative budget balance (i.e., balance deficit of the usage budget (262)). Between the zero balance and the cut off balance can be a traffic shaping zone, where traffic shaping delays can be introduced. Such traffic shaping delays can tend to bring the usage budget (262) for a user profile (260) back up to a zero balance, which indicates usage at or below the target usage rate. The cutoff balance may be substantially larger than the maximum burst value and substantially larger than the replenishment amount for a one hour period (e.g., ten to more than one-hundred times the maximum burst value), so as to avoid a user profile (260) reaching the cutoff balance unless the user profile (260) is exhibiting extremely high usage of the resources of the server (230). As just one example, if the maximum burst is ten seconds (10,000 milliseconds) and the recharge rate is two minutes per hour (120,000 milliseconds per hour), then the cutoff balance may be twenty minutes (1,200,000 milliseconds). In one example, usage can be measured in milliseconds for these parameters (and milliseconds per hour for recharge rate), although other units could be used.

When a user profile (260) first accesses the server (230), the user profile (260) can be assigned a new budget (262), which can be associated with a policy (264) specifying a recharge rate, maximum burst, and cutoff balance. A policy (264) and budget (262) may be included in a single object that specifies these parameters. For example, user input may be provided by a system administrator to specify these parameters to a user profile, group of user profiles, etc. Accordingly, these three parameters can define the policy (264) while the budget (262) can track usage against that policy, with the policy defining whether the balance is sufficient to indicate a sufficient trend by the associated user profile (260) toward the cutoff balance threshold to warrant taking action to protect the resource of the server (230) from overuse by the user profile (260).

Each new instance of a budget (262) can start with a balance equal to the maximum burst, so that the user immediately has the ability to perform bursty operations. Instances of the budgets (262) can be cached inside a process in the server that tracks the traffic-shaping information, so that repeated server usage requests (240) by a user profile (260) can result in the cached instance of the budget (262) being used, rather than a new instance for each request (240). This can allow the server (230) to track usage by a user profile (260) across multiple requests (240). If a user profile (260) goes long enough without submitting a request (240), the associated budget (262) may be removed from the cache. For example, this may be done when the balance of the budget (262) has reached the maximum burst balance. Accordingly, when another request (240) is received at the server (230) for that user profile (260), the request (240) can be treated as an initial request (240) from the user profile (260) and a new instance of a budget (262) for the user profile (260) can be generated and stored in the cache.

As the server (230) services requests (240) for a user profile (260), the budget (262) can be charged for the measured time spent doing work in the server (230). For example, the measured time may be the length of the call, which can begin when the request (240) is received and end when a response (250) to the request (240) is ready to be sent back to the client (210) that sent the request (240). Such charges can result in a decrease of the balance of the budget (262). At the same time, work done by the server (230) takes physical time, which means that the user profile (260) has also encountered a "recharge" or replenishment of the budget (262) equal to the elapsed time in hours multiplied by the recharge rate.

Accordingly, the following equation can represent the calculation of a new budget balance after work is done by the server (230) for a user profile: New Budget Balance=Old Budget Balance−Current Charge+(Time Since Old Budget Balance/3,600,000)* Recharge Rate. The value 3,600,000 is included as the number of milliseconds in one hour, thereby converting the Time Since Old Budget Balance from millisecond units to hour units to be consistent with the Recharge Rate, which is in terms of milliseconds per hour. In addition, the New Budget Balance can be capped at the maximum burst value.

While the budget balance is positive, the server (230) can service requests (240) without introducing traffic shaping delays because the balance suggests that the usage trend for the user profile (260) is below the usage target. However, if the budget balance becomes negative, that means that they user profile (260) has spent its maximum burst and has used more time on the server (230) than its recharge rate would allow for the period of time. Accordingly, the user profile (260) can be considered to have entered the traffic shaping zone.

When a request (240) is received, a long-lived object for the budget (262) can be wrapped by a per-request budget "wrapper." The long-lived object and the wrapper can both be considered to be part of the budget (262). The wrapper can store per-request information that is not shared across requests (240). Work that is done for the current request (240) can be tracked inside this budget "wrapper". For example, if the request (240) takes 500 milliseconds to execute, the budget wrapper can indicate that 500 milliseconds of work have been done. At the end of the call, before the response (250) is sent back to the calling client (210), the component of the server (230) using the budgeting framework can ask if any delays are warranted. If the underlying budget balance is positive, then no traffic shaping delays are introduced even though work was accomplished for the user profile (260) in response to the request (240). If, however, the budget balance is negative, then the request can be traffic shaped by introducing a traffic shaping delay.

The delay time for the traffic shaping delay may be calculated according to the following example, or in some other manner that accounts for resources used by the server (230) in processing the current request (240):

1. The amount of time it would take to recharge the budget based on the current recharge rate can be calculated as follows: Time to Recharge=Length of Current Call*3,600,000/Recharge Rate.
2. A "traffic shaping factor", which indicates how close the user profile is to having a deficit of "recharge rate" (which can indicate, for example, that a user profile (260) has used twice as much of the resources of the server (230) as it should during a one hour period), can be calculated as follows: Traffic Shaping Factor=Budget Deficit (negative budget balance) / Recharge Rate.
3. The Traffic Shaping Factor can be multiplied by the Time to Recharge to get the traffic shaping delay time.
4. The traffic shaping delay time can be capped at a maximum amount allowed by a protocol used for exchanging information between the server (230) and the client (210) that submitted the request. Each protocol can define request timeout limits as well as "acceptable" delays above which the user experience would suffer too greatly. These limits may be different for different types of requests, even within the same protocol.

If part of the traffic shaping delay is not honored due to capping at protocol limits, then the budget deficit may be larger for the next request (240) for that user profile (260), resulting in even larger calculated traffic shaping delays. As discussed above, if the user profile (260) keeps incurring larger deficits with subsequent requests (240), the deficit may eventually reach the cutoff balance, resulting in the user profile (260) being locked out for a period of time (e.g., for five minutes).

III. Techniques for Traffic Shaping Based on Current Usage

Several techniques for traffic shaping based on current usage will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique.

Figure 3:
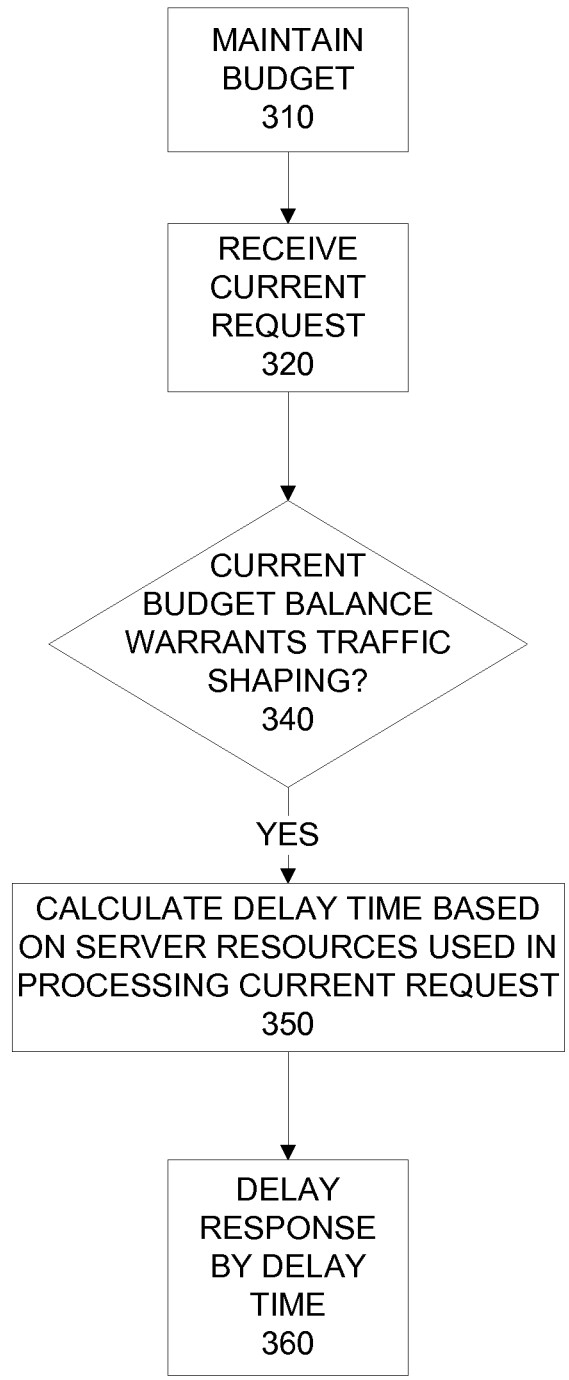
FIG. 3 is a flowchart of a technique for traffic shaping based on current server usage.

Referring to FIG. 3, a technique for traffic shaping based on current server usage will be described. The technique can include maintaining (310) a budget of server usage associated with a user profile. The technique can also include receiving (320) a current request for a server to perform work for a user profile, where the current request can be associated with the user profile. It can be determined (340) whether a current balance of the budget warrants performing traffic shaping for the user profile by delaying a response to the current request (e.g., where the current balance is below a threshold, such as where the budget balance is below zero). If the current balance of the budget warrants delaying the response, then a delay time can be calculated (350) based on a quantity of server resources used in processing the current request, and the response can be delayed (360) by the delay time.

Determining (340) whether the current balance of the budget warrants performing traffic shaping for the user profile can include determining whether the current balance of the budget indicates a sufficient trend toward a threshold budget value to warrant performing traffic shaping for the user profile. For example, this sufficiency could be indicated by a budget deficit, or negative budget balance, as discussed above.

Calculating (350) the delay time can be performed after the request has been processed at the server and prior to sending the response to the request. Also, calculating (350) the delay time can include calculating the delay time based on an amount of time used in responding to the current request. For example, the delay time can be calculated to be proportional to the amount of time used in responding to the current request. The delay time may also be calculated based on the current balance of the budget. For example, the delay time may be calculated to be proportional to a current deficit in the budget balance. Calculating (350) the delay time may include capping the delay time at a maximum amount, such as a maximum amount specified in a protocol.

Maintaining (310) the budget can include replenishing the budget over time, and may also include capping the budget at a maximum balance. A burst amount of the budget can be used before response delays are warranted. Also, a carry-over balance of the budget can be carried over and used to determine whether future traffic-shaping delays for the profile are warranted.

Figure 4:
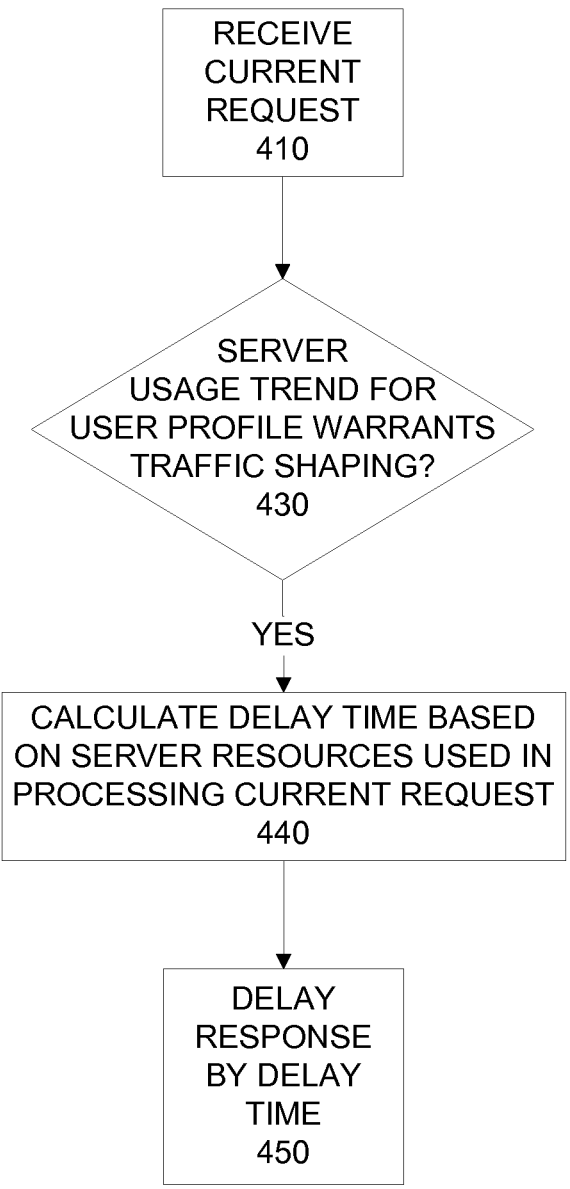
FIG. 4 is a flowchart of another technique for traffic shaping based on current server usage.

Referring to FIG. 4, another technique for traffic shaping based on current server usage will be described. The technique can include receiving (410) a current request for a server to perform work for a user profile. The current request can be processed (420) at the server. It can be determined (430) whether server usage by the user profile exhibits a sufficient trend toward a threshold value to warrant performing traffic shaping for the user profile according to a traffic shaping policy. If server usage by the user profile exhibits a sufficient trend toward a threshold value to warrant performing traffic shaping, then a delay time can be calculated (440) based on server resources used in processing the current request, and a response to the current request can be delayed (450) by the delay time.

The technique of FIG. 4 can also include maintaining a budget of server usage associated with the user profile. Determining (430) whether server usage by the user profile exhibits a sufficient trend toward a threshold value to warrant performing traffic shaping for the user profile can include determining whether a current balance of the budget warrants performing traffic shaping for the user profile, which may be determined according to the policy. A burst amount of the budget can be used before response delays are warranted. The policy can define the burst amount of the budget.

The technique of FIG. 4 can further include replenishing the budget over time at a rate defined by the policy and capping the budget at a maximum balance, which may also be defined by the policy.

Calculating (440) the delay time based on server resources used in processing the current request can include calculating the delay time based on an amount of time used in responding to the current request. Also, calculating (440) the delay time can include calculating the delay time after the request has been processed at the server and prior to sending the response to the request. Calculating (440) the delay time can include calculating the delay time based on an amount of time used in responding to the current request. For example, the delay time can be calculated to be proportional to the amount of time used in responding to the current request.

Figure 5:
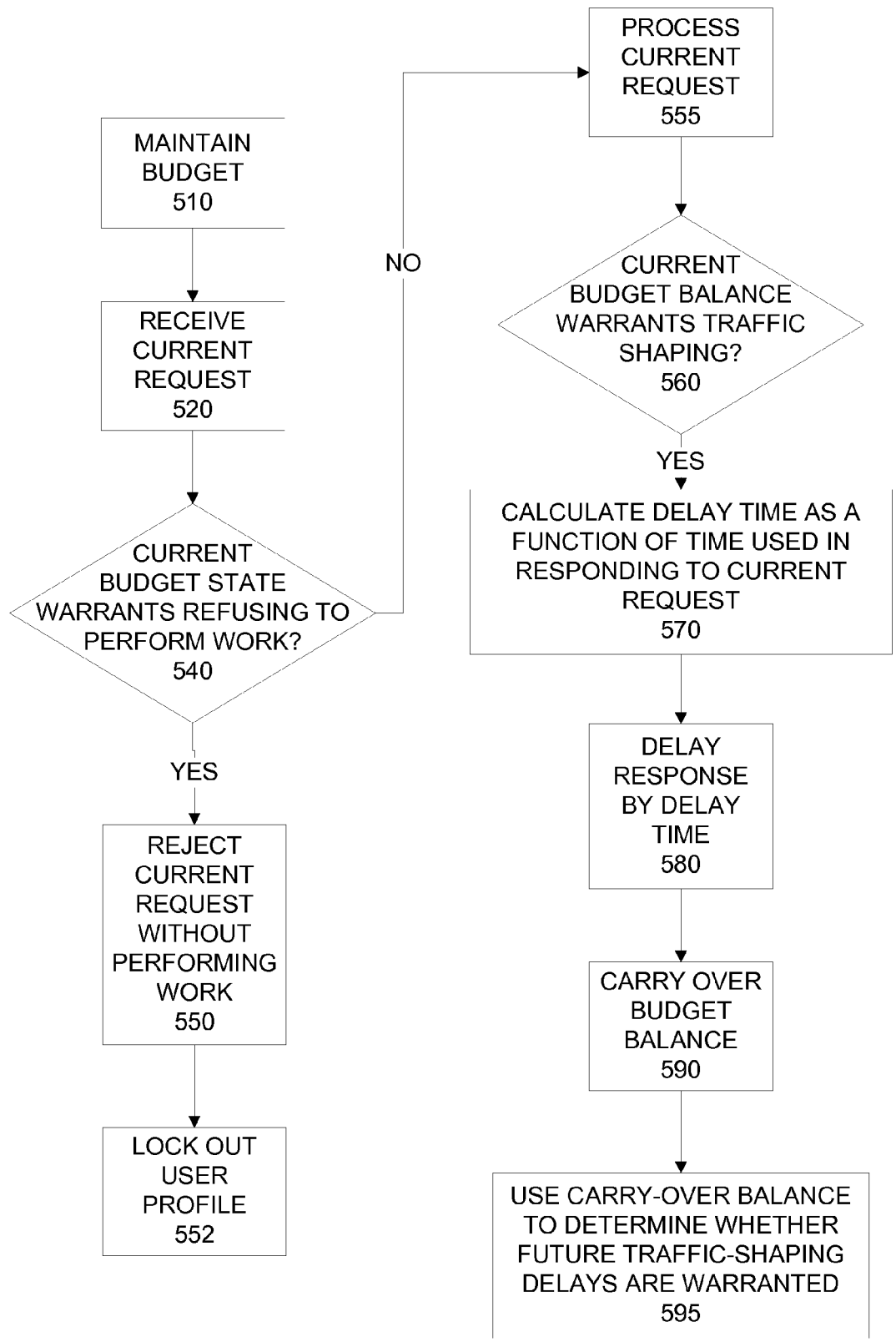
FIG. 5 is a flowchart of yet another technique for traffic shaping based on current server usage.

Referring now to FIG. 5, yet another technique for traffic shaping based on current server usage will be described. The technique can include maintaining (510) a budget of server usage associated with a user profile. Maintaining (510) the budget can include replenishing the budget over time and capping the budget at a maximum balance. A current request for a server to perform work for the user profile can be received (520). The current request can be associated with the user profile. It can be determined (540) whether a state of the budget warrants refusing to perform work for the user profile. If the state of the budget does warrant refusing to perform work for the user profile, then the technique can include rejecting (550) the current request without performing work requested by the current request, and may also include locking out (552) the user profile for a period of time.

If the state of the budget does not warrant refusing to perform work for the user profile, then the current request can be processed (555) at the server. Additionally, if the state of the budget does not warrant refusing to perform work for the user profile, then it can be determined (560) whether a current balance of the budget indicates a sufficient trend toward a threshold budget value to warrant performing traffic shaping for the user profile according to a traffic shaping policy. The traffic shaping policy can define a burst amount of the budget that can be used before response delays are warranted. If the state of the budget does not warrant refusing to perform work for the user profile and if the current balance of the budget indicates a sufficient trend toward a threshold budget value (such as a deficit value) to warrant performing traffic shaping for the user profile, then the technique can include calculating (570) a delay time as a function of an amount of time used in responding to the current request and delaying (580) the response by the delay time. The delay time can be calculated (570) after the request has been processed at the server and prior to sending the response to the request. Also, a carry-over balance of the budget can be carried over (590) and used (595) to determine whether future traffic-shaping delays for the profile are warranted.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method for protecting server resources from over-use by a user profile and allowing user experience to be preserved, the method comprising:

maintaining, via a computer server system, a computer-readable budget of server usage associated with a computer-readable user profile;

receiving, via the computer server system, a computer-readable current request for a server to perform work for the user profile;

determining, via the computer server system, that a current balance of the budget warrants performing traffic shaping to decrease a rate of server resource usage by the user profile by introducing a delay in a response to the current request; and calculating, via the computer server system, a delay time based on server resources used in processing the current request; and in response to the determination that the current balance of the budget warrants performing traffic shaping for the user profile by introducing the delay in the response to the current request, introducing, via the computer server system, the delay in the response to the current request, the introduced delay being for the calculated delay time, the introducing of the delay being performed after the calculating of the delay time, and the introducing of the delay decreasing the rate of server resource usage by the user profile.

2. The method of claim 1, wherein the determining that the current balance of the budget warrants performing traffic shaping for the user profile comprises determining that the current balance of the budget indicates a sufficient trend toward a threshold budget value to warrant performing traffic shaping for the user profile.

3. The method of claim 1, wherein the calculating the delay time is performed after the request has been processed at the server and prior to sending the response to the request.

4. The method of claim 1, further comprising carrying over a carry-over balance of the budget and using the carry-over balance of the budget to determine whether future traffic-shaping delays for the profile are warranted.

5. The method of claim 1, wherein the maintaining the budget comprises replenishing the budget over time.

6. The method of claim 5, wherein the maintaining the budget comprises capping the budget at a maximum balance.

7. The method of claim 6, wherein the determining that the current balance of the budget warrants performing traffic shaping for the user profile comprises allowing a burst amount of the budget to be used before determining that response delays are warranted.

8. The method of claim 1, wherein the calculating the delay time based on server resources used in processing the current request comprises calculating the delay time based on an amount of time used in responding to the current request.

9. The method of claim 1, wherein the delay time is calculated based on the current balance of the budget.

10. The method of claim 1, wherein the request is a first request, and wherein the method further comprises determining that a state of the budget warrants refusing to perform work for the user profile, and in response to determining that the state of the budget does warrant refusing to perform work for the user profile, rejecting a second request without performing work requested by the second request.

11. The method of claim 1, wherein the calculating the delay time comprises capping the delay time at a maximum amount.

12. A computer system comprising at least one processor, and memory comprising instructions stored thereon that when executed by at least one processor cause at least one processor to perform acts for protecting server resources from over-use by a user profile and allowing user experience to be preserved, the acts comprising:

receiving a computer-readable current request for a server in the computer system to perform work for a computer-readable user profile;

determining that computer server usage by the user profile exhibits a sufficient trend toward a threshold value to warrant performing traffic shaping for the user profile according to a computer-readable traffic shaping policy;

calculating a delay time based on computer server resources used in processing the current request; and in response to the determination that the server usage by the user profile exhibits a sufficient trend toward the threshold value to warrant performing traffic shaping, introducing a delay in a response to the current request, the introduced delay being for the calculated delay time, and the introducing of the delay increasing a response time of the response to the current request.

13. The computer system of claim 12, wherein the acts further comprise maintaining a budget of server usage associated with the user profile, and wherein the determining that server usage by the user profile exhibits a sufficient trend toward a threshold value to warrant performing traffic shaping for the user profile comprises determining that a current balance of the budget warrants performing traffic shaping for the user profile.

14. The computer system of claim 13, wherein a burst amount of the budget can be used before response delays are warranted, the policy defining the burst amount of the budget.

15. The computer system of claim 13, wherein the acts further comprise replenishing the budget over time at a rate defined by the policy and capping the budget at a maximum balance.

16. The computer system of claim 12, wherein the calculating the delay time based on server resources used in processing the current request comprises calculating the delay time based on an amount of time used in responding to the current request.

17. The computer system of claim 12, wherein the calculating the delay time comprises calculating the delay time after the request has been processed at the server and prior to sending the response to the request.

18. The computer system of claim 12, wherein the calculating the delay time based on server resources used in processing the current request comprises calculating the delay time based on an amount of time used in responding to the current request.

19. The computer system of claim 18, wherein the delay time is calculated to be proportional to the amount of time used in responding to the current request.

20. One or more computer-readable storage media having computer-executable instructions embodied thereon that, when executed by at least one processor, cause at least one processor to perform acts for protecting server resources from over-use by a user profile and allowing user experience to be preserved, the acts comprising:

maintaining a budget of computer server usage associated with a computer-readable user profile;

receiving a computer-readable current request for a computer server to perform work for the user profile, the current request being associated with the user profile;

determining that a computer-readable current balance of the budget indicates a sufficient trend toward a threshold budget value to warrant performing traffic shaping for the user profile according to a computer-readable traffic shaping policy;

calculating a delay time as a function of an amount of time used in responding to the current request, the calculating the delay time being performed after the request has been processed at the server; and in response to the determination that the current balance of the budget indicates a sufficient trend toward the threshold budget value to warrant performing traffic shaping for the user profile according to the traffic shaping policy, introducing a delay for the delay time in a response to the current request, and the introducing of the delay increasing a response time of the response to the current request.

* * * * *